US012793097B2

(12) United States Patent
Woytarowicz et al.

(10) Patent No.: US 12,793,097 B2
(45) Date of Patent: Nov. 10, 2026

(54) GENERATION OF MODELS FOR PREDICTING PERSONA BEHAVIOR

(71) Applicant: Twilio Inc., San Francisco, CA (US)

(72) Inventors: Nicole Woytarowicz, Allen, TX (US); Samuel Vaughn Tucker, Minneapolis, MN (US); Inga Mgherbrishvili, Kirkland, WA (US); Rowan Michael Wing, Longmont, CO (US); Hanhan Wang, Seattle, WA (US)

(73) Assignee: Twilio Inc., San Francisco, CA (US)

( * ) Notice: Subject to any disclaimer, the term of this patent is extended or adjusted under 35 U.S.C. 154(b) by 148 days.

(21) Appl. No.: 17/655,735

(22) Filed: Mar. 21, 2022

(65) Prior Publication Data

US 2023/0298058 A1 Sep. 21, 2023

(51) Int. Cl.
*G06Q 30/0201* (2023.01)
*G06Q 30/0204* (2023.01)

(52) U.S. Cl.
CPC ..... *G06Q 30/0205* (2013.01); *G06Q 30/0201* (2013.01)

(58) Field of Classification Search
CPC ....................... G06Q 30/0201; G06Q 30/0205
See application file for complete search history.

(56) References Cited

U.S. PATENT DOCUMENTS 10,909,569 B1 2/2021 Shah et al.
11,151,468 B1 10/2021 Chen et al.
11,188,846 B1 11/2021 He et al.
11,880,377 B1 * 1/2024 Tsang .................. G06F 16/2468
2010/0049538 A1 * 2/2010 Frazer ................ G06Q 30/0244 705/14.43
2018/0084078 A1 * 3/2018 Yan ......................... H04L 67/63
2018/0103004 A1 4/2018 Demir et al.
2018/0212890 A1 7/2018 Yan
2018/0300756 A1 10/2018 Saxena et al.

(Continued)

OTHER PUBLICATIONS

"U.S. Appl. No. 17/655,724, Advisory Action mailed May 31, 2024", 2 pgs.

(Continued)

*Primary Examiner* — Deirdre D Hatcher
(74) *Attorney, Agent, or Firm* — Schwegman Lundberg & Woessner, P.A.

(57) ABSTRACT

Methods, systems, and computer programs are presented for estimating a propensity to buy a product or service. One method includes accessing events generated at a website. Each event comprises a data structure describing an operation performed by a user when accessing the website. Further, the method performs operations, for each user from a group of users associated with an audience, comprising: providing event information for a time window, information of the user, and information for a product as input to a propensity machine-learning (ML) model, the model being trained with training data comprising values for features that include event features, user information features, and audience labels; and generating, by the propensity ML model, a score for the user indicating a probability that the user will purchase the product. Further, the method generates a forecast of purchases of the product for the users in the audience based on the scores.

20 Claims, 13 Drawing Sheets

(56) References Cited

U.S. PATENT DOCUMENTS

| | | | | |
|---|---|---|---|---|
| 2019/0347689 | A1 | 11/2019 | Bullock et al. | |
| 2020/0019644 | A1 | 1/2020 | Mazouchi et al. | |
| 2020/0034858 | A1* | 1/2020 | Chandra Sekar Rao .................... | G06N 3/044 |
| 2020/0084280 | A1 | 3/2020 | Malhotra et al. | |
| 2020/0104738 | A1 | 4/2020 | Williams et al. | |
| 2020/0233916 | A1 | 7/2020 | Hoots et al. | |
| 2020/0320607 | A1 | 10/2020 | Beauchamp | |
| 2020/0327444 | A1 | 10/2020 | Negi et al. | |
| 2021/0004422 | A1 | 1/2021 | Sun et al. | |
| 2021/0042796 | A1 | 2/2021 | Khoury et al. | |
| 2021/0081468 | A1 | 3/2021 | Raman et al. | |
| 2022/0253490 | A1 | 8/2022 | Tai et al. | |
| 2022/0277210 | A1 | 9/2022 | Malhotra et al. | |
| 2022/0277211 | A1 | 9/2022 | Malhotra et al. | |
| 2023/0032739 | A1* | 2/2023 | De Jaegher ............ | G06N 20/00 |
| 2023/0076327 | A1 | 3/2023 | Matsuoka et al. | |
| 2023/0298055 | A1 | 9/2023 | Woytarowicz et al. | |

OTHER PUBLICATIONS

"U.S. Appl. No. 17/655,724, Examiner Interview Summary mailed Dec. 13, 2023", 3 pgs.
"U.S. Appl. No. 17/655,724, Final Office Action mailed Mar. 27, 2024", 13 pgs.
"U.S. Appl. No. 17/655,724, Non Final Office Action mailed Jul. 30, 2024", 8 pgs.
"U.S. Appl. No. 17/655,724, Non Final Office Action mailed Sep. 21, 2023", 14 pgs.
"U.S. Appl. No. 17/655,724, Notice of Allowability mailed Dec. 9, 2024", 2 pgs.
"U.S. Appl. No. 17/655,724, Notice of Allowance mailed Nov. 22, 2024", 9 pgs.
"U.S. Appl. No. 17/655,724, Response filed May 24, 2024 to Final Office Action mailed Mar. 27, 2024", 13 pgs.
"U.S. Appl. No. 17/655,724, Response filed Oct. 29, 2024 to Non Final Office Action mailed Jul. 30, 2024", 10 pgs.
"U.S. Appl. No. 17/655,724, Response filed Dec. 14, 2023 to Non Final Office Action mailed Sep. 21, 2023", 15 pgs.
Chaudhuri, Neha, et al., "On the platform but will they buy? Predicting customers' purchase behavior using deep learning", Decision Support Systems 149, 113622, (2021), 10 pgs.
Koehn, Dennis Stefan, et al., "Predicting online shopping behaviour from clickstream data using deep learning", Expert Systems with Applications 150, 113342, (2020), 30 pgs.
"U.S. Appl. No. 19/058,775, Non Final Office Action mailed Apr. 3, 2026", 11 pgs.
"U.S. Appl. No. 19/058,775, Examiner Interview Summary mailed Jun. 11, 2026", 2 pgs.
"U.S. Appl. No. 19/058,775, Response filed Jul. 2, 2026 to Non Final Office Action mailed Apr. 3, 2026", 11 pgs.
"U.S. Appl. No. 19/058,775, Notice of Non Compliant Amendment mailed Sep. 11, 2026", 3 pgs.

* cited by examiner

FEATURES

1002

| | |
|---|---|
| n_orders | Number of orders in feature window (FW) |
| n_items_ordered | Number of items ordered inFW |
| n_items_in_cart | Number of items added to cart in FW |
| n_items_in_list | Number of items in wishlist |
| n_page_views | Number of page views in FW |
| n_cart_views | Number of cart views in FW |
| d_since_order | Days since last order (from last day of FW (LDFW)) |
| d_since_page_view | Days since last page view (from LDFW) |
| d_since cart_add | Days since last cart add (from LDFW) |
| d_since_list_add | Days since last wishlist addition (from LDFW) |
| total_value | Total send in FW normalized by currency |
| last_order_value | Value of last order normalized by currency |
| total_cart_value | Total value items added to cart (normalized currency) |

FIG. 10

GENERATION OF MODELS FOR PREDICTING PERSONA BEHAVIOR

CROSS-REFERENCE TO RELATED APPLICATIONS

This application is related to U.S. patent application Ser. No. 17/655,724 filed on the same day as the instant application and entitled "Generation of Models For Classifying User Groups", which is incorporated herein by reference in their entirety.

BRIEF DESCRIPTION OF THE DRAWINGS

Various of the appended drawings merely illustrate example embodiments of the present disclosure and cannot be considered as limiting its scope.

FIG. 10 is a table showing some example features for use in machine learning.

DETAILED DESCRIPTION

Figure 1:
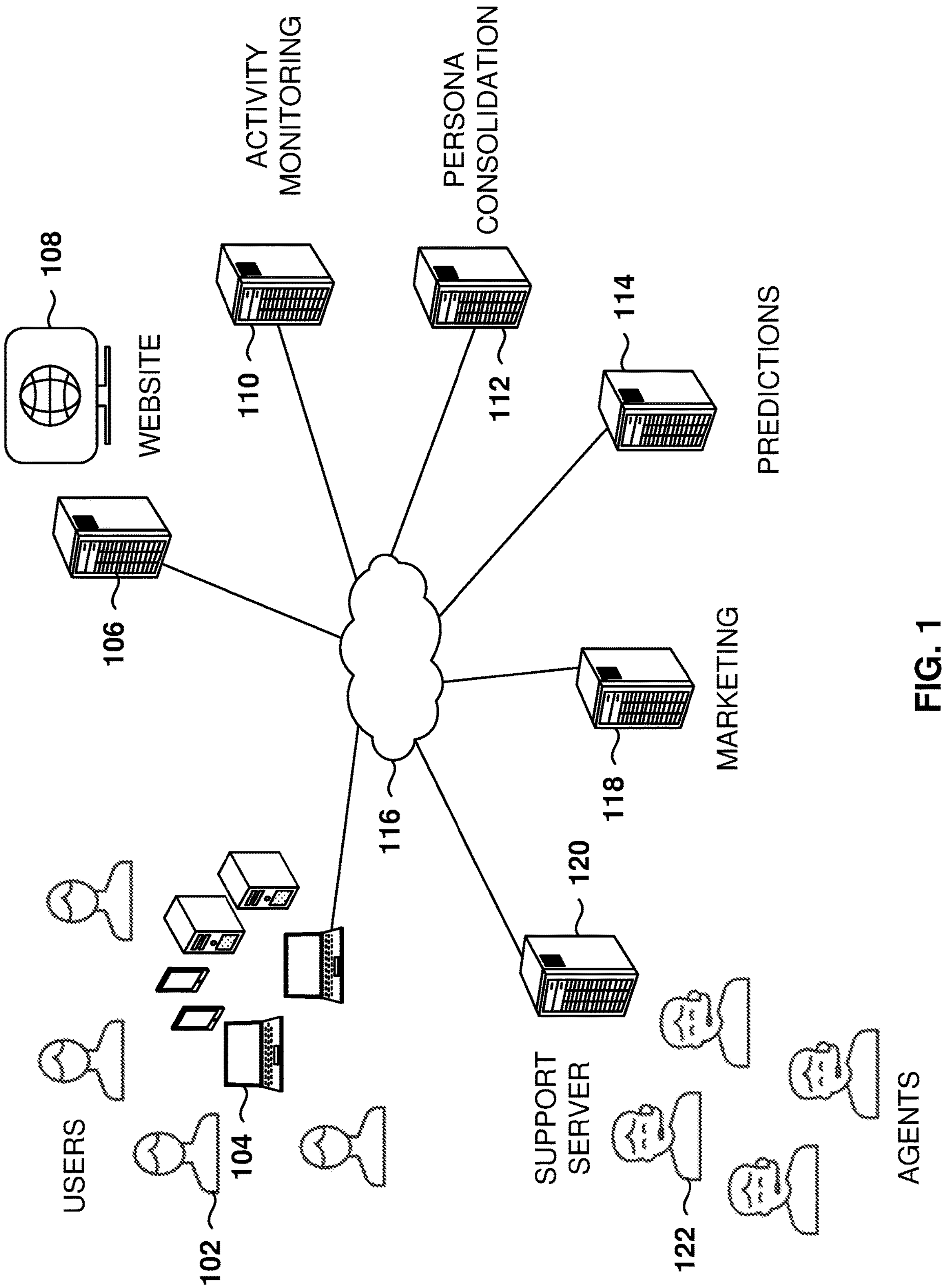
FIG. 1 illustrates a network environment for practicing embodiments.

Example methods, systems, and computer programs are directed to estimating the propensity to buy a product or service. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

What is needed are methods to monitor customers and consolidate customer information from multiple sources. The consolidation information may be used by machine-learning systems that predict possible purchases of customers, as well as prioritize those customers with high purchasing potential.

In one aspect, the information from many users and multiple sources are combined to better predict future behavior. The correlation of information includes identifying personas, which aggregates the activities of a single user accessing information from multiple devices and multiple identifiers (e.g., name, login, email, IP address, cookie, etc.). Further, user may be combined into groups, also referred to herein as audiences, according to criteria defined for the group, and forecasting may be performed for the group of users (e.g., sales of a product over the next month).

The forecasting is based not only on user information, but on events taking place over a window of time, such as visiting a product page or visiting pages of products in the same category (e.g., on a laptop). The forecasting techniques using machine-learning (ML) models are improved because of the use of better information and analysis of user events.

One method includes an operation for accessing events generated at a website. Each event comprises a data structure describing an operation performed by a user, from a group of users, when accessing the website. Further, the method includes an operation for providing event information and information of a first user, for a predefined time window, as input to an audience machine-learning (ML) model. The audience ML model is trained with training data comprising values for features that include event features, user information features, and audience labels. The method further includes operations for generating, by the audience ML model, a score for the first user indicating a probability that the first user belongs to the audience, and for determining if the user belongs to the audience based on the score.

One method includes an operation for accessing events generated at a website. Each event comprises a data structure describing an operation performed by a user, from a group of users, when accessing the website. Further, the method performs operations, for each user from a plurality of users associated with an audience, comprising: providing event information for a predefined time window, information of the user, and information for a first product as input to a propensity machine-learning (ML) model, the propensity ML model being trained with training data comprising values for features that include event features, user information features, and audience labels; and generating, by the propensity ML model, a score for the user indicating a probability that the user will purchase the first product within a predetermined time window. Further the method includes an operation for generating a forecast of purchases of the first product for the plurality of users associated with the audience based on the scores.

Glossary

Below are provided definitions of terms used to describe the embodiments:

Identity Resolution (IR): Process of grouping traits and events that are associated with the same user.

Identity Resolution trait: a trait that is an identifying property of an end user, e.g., email, account identifier (ID), phone number, session token. IR trait values are defined per user.

Event: a structured description of a user behavior. Events include at least one IR "trait" to link the properties to a particular identity. The event provides information on a user's interactions or an occurrence at a point in time, and each event includes properties that describe the context around the behavior, such as state changes and timestamps. Examples include SMS sent, phone call, cart add, and ticket status updated.

Identity graph: a graph of IR traits where an edge exists between two IR traits if they have been used together to describe a user.

End user profile: events and traits connected to a common set of IR traits.

Intelligent profile: An extension to the customer profile that allows agents to view intelligent attributes of a customer, such as churn risk, value, product/action recommendations, etc.

Unified profile: a combination of disparate customer data sources (CRMs, payment systems, internal data sources, etc.) into a single holistic view. The unified profile allows agents to view attributes such as customer name, location, contact information, contact preferences, active products, etc.

Audience: a group of users with a similar attribute (e.g., anyone who buys a specific product, anyone with a churn score greater than a certain threshold value, etc.).

Personas: a unified user profile of a user that may have multiple identifiers when interacting with web services, such as name, login ID, internet protocol (IP) address, cookie on a website page, etc.

Value score: a score defining a user's overall value to a business.

Conversion score: a score defining a customer's likelihood to convert to a sale.

FIG. 1 illustrates a network environment for practicing embodiments. A plurality of users 102 uses the network 116 to access one or more resources, such as website 108 hosted by web server 106. The users 102 may utilize one or more devices 104 to access the resources. For example, a user may use a laptop, a desktop, and a mobile phone to access the resources.

An activity-monitoring server 110 tracks activities of the users online, such as when accessing the website 108. The website 108 may be an ecommerce website where products are sold. Also, the website 108 may provide support services to users, and may facilitate the connection of users 102 to agents 122 that provide support services hosted by support server 120.

The support server 120 provides communications between users 102 and agents 122 and may record the support calls for further quality control and analysis. The support server 120 receives call requests from users 102 and routes the calls to agents 122. In some example embodiments, the support server 120 gives higher priority of response to users 102 that are considered important based on past, present, or future purchases.

The persona consolidation server 112 analyzes user activity and consolidates user activity into personas. For example, a user 102 may be identified in multiple ways when accessing a website (via name, cookie, phone number, login, or IP address), therefore, the monitoring may not realize that the same user is accessing a resource in multiple ways. The persona consolidation server 112 analyzes all the activities to find the correlations and consolidate the information associated with the same user into a persona.

The persona information provides a richer set of data, such as events associated with the persona, that improves the predictive ability of predictions server 114. The predictions server 114 includes tools to make predictions based on user information (e.g., activity monitoring, personas). The predictions may include a propensity to buy a product within a future window (e.g., next two days, next week, next month, etc.).

Propensity to buy is a probability that an event will occur within a given time window. The predictions server 114 calculates events that are likely to occur within a time window and builds forecasts that aggregate the predictions into actual number estimates (e.g., volume of sales of a product for the next 30 days).

The predictions server 114 may also calculate a probability that a user or a persona belongs to a certain audience. The audience is defined by one or more attributes that are configurable. For example, an audience may be personas to spend over $500 over the next thirty days, personas that have sent more than $10,000 over the last year, personas that have purchased more than a threshold of products from a merchant in the last six months, etc.

Further, a marketing server 118 provides marketing functions, such as selecting users for promotions, sending communications to users (e.g., email, SMS, WhatsApp, etc.), selecting the communication channel for each user, allowing users to set communication preferences, measuring responses to communications, etc.

It is noted that the embodiments illustrated in FIG. 1 are examples and do not describe every possible embodiment. Other embodiments may utilize different servers, multiple servers for the same function, combine the functionality of multiple servers, etc. The embodiments illustrated in FIG. 1 should therefore not be interpreted to be exclusive or limiting, but rather illustrative.

Figure 2:
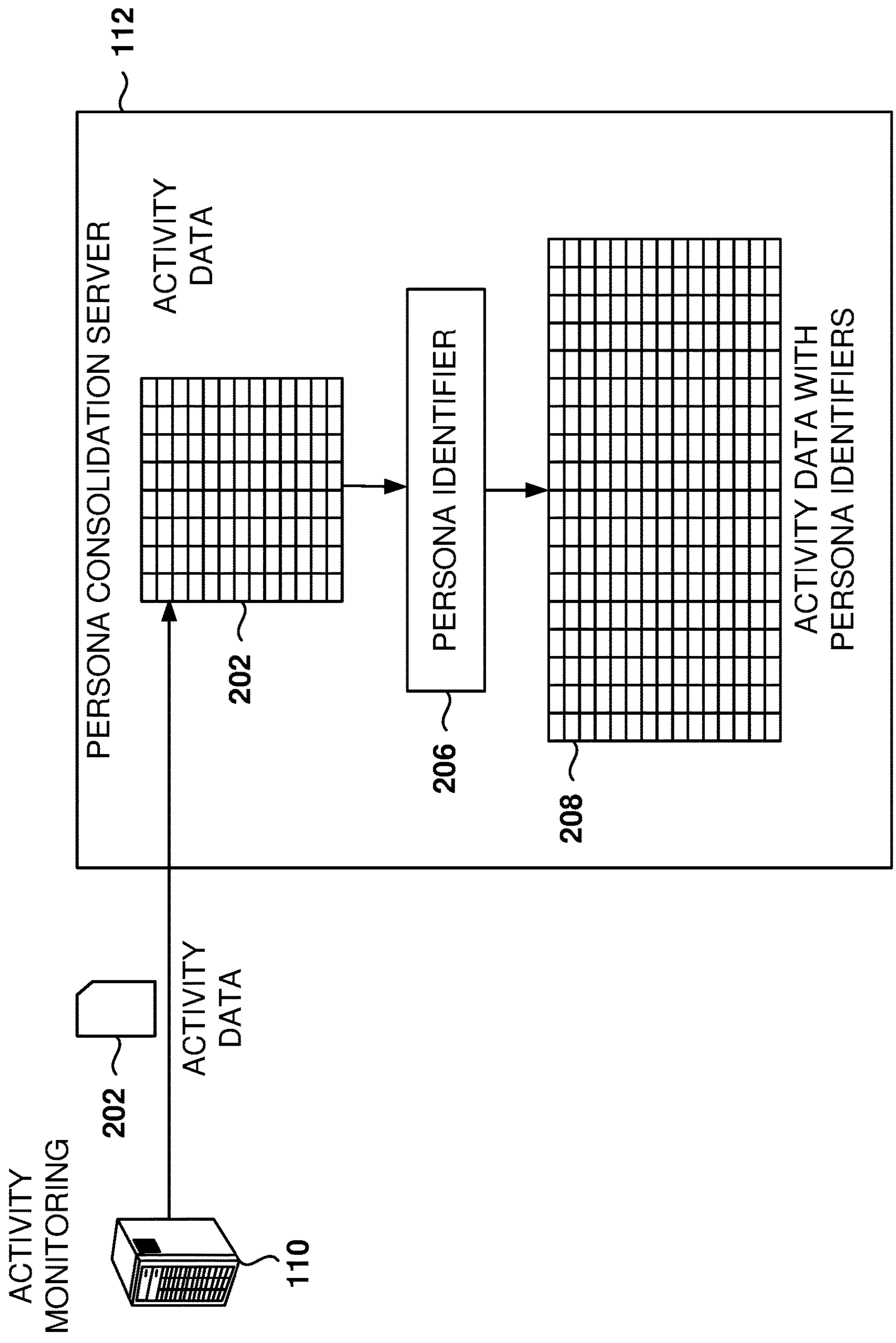
FIG. 2 illustrates the determination of personas from activities having different identifiers, according to some example embodiments.

FIG. 2 illustrates the determination of personas from activities having different identifiers, according to some example embodiments. The activity monitoring server 110 (or some other source of activity data) sends the activity data 202 to the persona consolidation server 112.

The activity data 202 includes traits and events that are processed by the persona identifier program 206 to correlate the activity data with other user data. An event associates a user with an action, e.g., click, page view, support call, purchase.

The persona identifier program 206 determines which events and traits are associated with the same persona and assigns a unique persona identifier to all the events associated with that persona. The persona identifier program 206 correlates events that relate to each other by some data value. For example, one event may associate the user with an email and a phone number, causing the persona identifier program 206 to assign both values to the same persona ID. Another event may be associated with the same user name and a laptop IP address, where the IP address is assigned to the same persona. That is, the persona identifier program 206 matches persona parameter values (e.g., IR traits) based on event and user profile information when those parameter values are found for the same user. The end result is that the persona ID is associated with all the different data tokens (IR traits) associated with the user corresponding to the persona ID.

In other examples, some events may refer to a user name and others to an IP address for the same user. The persona identifier program 206 determines that the user name and IP address refer to the same person (referred to herein as a persona) and determines that those events are for the same persona. The result is augmented activity data 208 with persona identifiers that includes the additional persona ID and may also include other information associated with the user and the events.

In same sample embodiments, the persona identifier program 206 uses an identity graph, where each trait value is assigned a node and nodes representing the end user are connected in the identity graph. For example, {"phone number": "5551234567", "Email": "foo@gmail.com"} are traits for the same persona and the nodes for 5551234567 and foo@gmail.com are interconnected in the identity graph. As the persona identifier program 206 traverses the activity data, the found correlations are marked as connections in the identity graph.

The augmented activity data 208 allows the system to enhance the user profiles with additional information, such as recent purchases, historical spending, etc.

Here is an example of a tracked event for a purchase of shoes and a shirt:

```
{"email": "foo@gmail.com",
"event": "Order Completed",
"properties": {"item": Shoes, "Price": 75.00}}
{"phone number": "5551234567",
"event": "Order Completed",
"properties": {"item": Shirt, "Price": 35.00}}
```

This event includes the email and phone number of the user; thus, these two IR traits are assigned to the same persona.

In some example embodiments, the augmented activity data 208 is organized by persona ID, which makes retrieving information for a persona quick. For example, one row of the augmented activity data 208 includes a list of the events associated with the persona ID. Here is an example:

```
{"persona id":456,
  "Events":{
  "Order Completed":[{"properties":
{"item": Shoes, "Price": 75.00},
  ...],
"Click": [<click events>]...
}
}
```

The augmented activity data 208 may also include a table where items are ordered and indexed by event type.

The persona identifier program 206 will periodically analyze the activity data, including older data and new data. As new data is gathered, additional correlations may be found in the events and user information to find common persona traits. This way, the persona identifier program 206 is able to look at historical data to resolve the persona identity graph. For example, the user John Doe may be associated with several cookies of browsers used by John Doe in multiple devices. As more correlations are made, more information is available for the personas. These correlations help in the creation of better training sets for making predictions.

Figure 3:
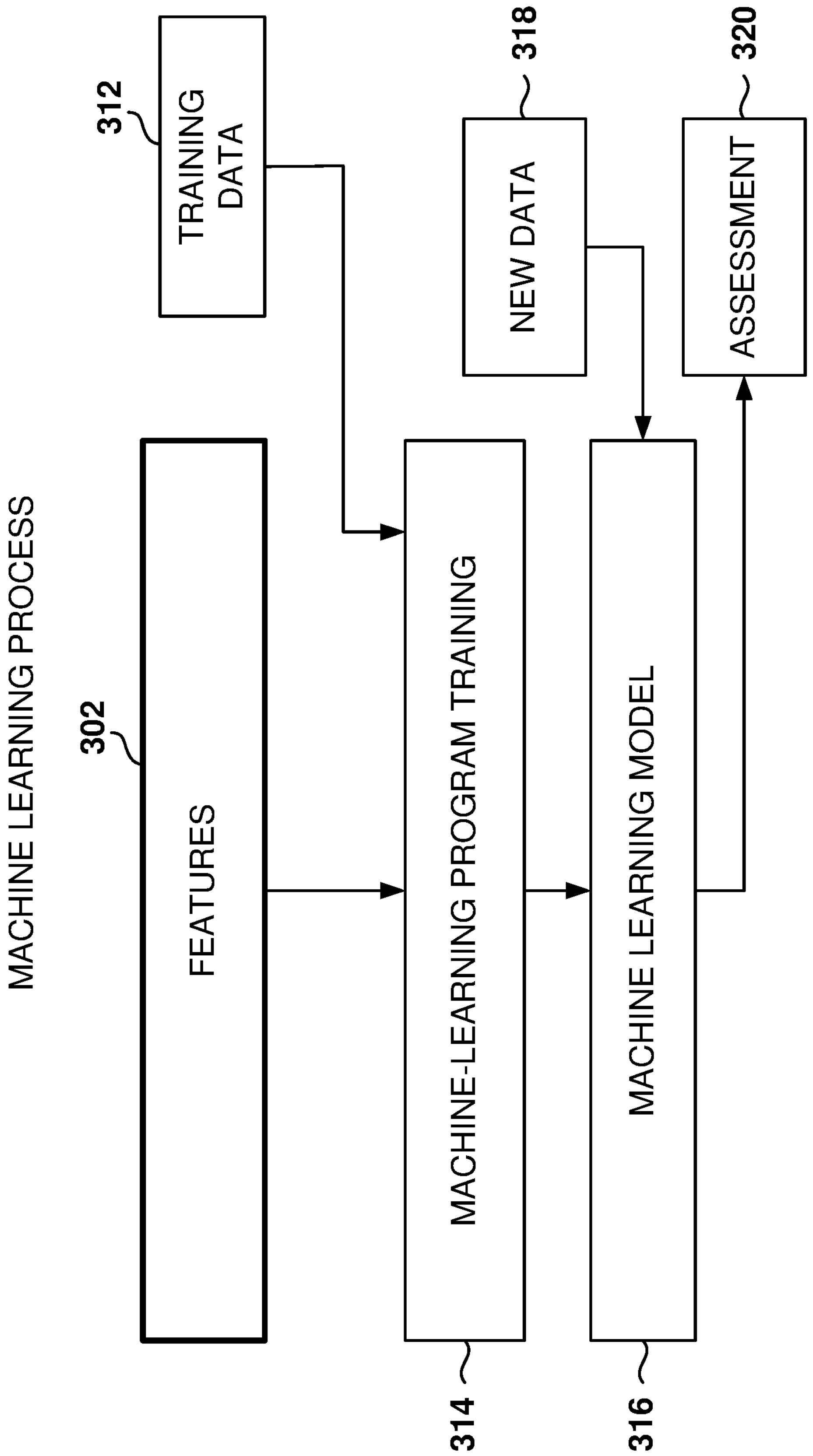
FIG. 3 illustrates the training and use of a machine-learning model, according to some example embodiments.

FIG. 3 illustrates the training and use of a machine-learning model, according to some example embodiments. In some example embodiments, machine-learning (ML) models 316, are utilized to perform operations associated with persona determination, predicting propensity to buy, determining an audience score, and routing calls.

Machine Learning (ML) is an application that provides computer systems the ability to perform tasks, without explicitly being programmed, by making inferences based on patterns found in the analysis of data. Machine learning explores the study and construction of algorithms, also referred to herein as tools, that may learn from existing data and make predictions about new data. Such machine-learning algorithms operate by building an ML model 316 from example training data 312 in order to make data-driven predictions or decisions expressed as outputs or assessments 320. Although example embodiments are presented with respect to a few machine-learning tools, the principles presented herein may be applied to other machine-learning tools.

Data representation refers to the method of organizing the data for storage on a computer system, including the structure for the identified features and their values. In ML, it is typical to represent the data in vectors or matrices of two or more dimensions. When dealing with large amounts of data and many features, data representation is important so that the training is able to identify the correlations within the data.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm using information that is neither classified nor labeled, and allowing the algorithm to act on that information without guidance. Unsupervised ML is useful in exploratory analysis because it can automatically identify structure in data.

Common tasks for supervised ML are classification problems and regression problems. Classification problems, also referred to as categorization problems, aim at classifying items into one of several category values (e.g., this object is an apple or an orange). Regression algorithms aim at quantifying some items (for example, by providing a score to the value of some input). Some examples of commonly used supervised-ML algorithms are Logistic Regression (LR), Naive-Bayes, Random Forest (RF), neural networks (NN), deep neural networks (DNN), matrix factorization, and Support Vector Machines (SVM).

Some common tasks for unsupervised ML include clustering, representation learning, and density estimation. Some examples of commonly used unsupervised-ML algorithms are K-means clustering, principal component analysis, and autoencoders.

The training data 312 comprises examples of values for the features 302. In some example embodiments, the training data comprises labeled data with examples of values for the features 302 and labels indicating the outcome, such as a purchase, a visit to a website, adding an item to a cart, etc. The machine-learning algorithms utilize the training data 312 to find correlations among identified features 302 that affect the outcome. A feature 302 is an individual measurable property of a phenomenon being observed. The concept of a feature is related to that of an explanatory variable used in statistical techniques such as linear regression. Choosing informative, discriminating, and independent features is important for effective operation of ML in pattern recognition, classification, and regression. Features may be of different types, such as numerical, strings, categorical, and graph. A categorical feature is a feature that may be assigned a value from a plurality of predetermined possible values (e.g., this animal is a dog, a cat, or a bird).

In some sample embodiments, the features 302 include features associated with the user profile (e.g., name, persona ID, email address, phone number, city of residence, etc.), and features associated with events (e.g., purchases, timestamp, website views, amount spent, time window for the events, etc.).

During training 314, the ML program, also referred to as ML algorithm or ML tool, analyzes the training data 312 based on identified features 302 and configuration parameters defined for the training. The result of the training 314 is the ML model 316 that is capable of taking inputs to produce assessments.

Training an ML algorithm involves analyzing large amounts of data (e.g., from several gigabytes to a terabyte or more) in order to find data correlations. The ML algorithms utilize the training data 312 to find correlations among the identified features 302 that affect the outcome or assessment 320. In some example embodiments, the training data 312 includes labeled data, which is known data for one or more identified features 302 and one or more outcomes.

The ML algorithms usually explore many possible functions and parameters before finding what the ML algorithms identify to be the best correlations within the data; therefore, training may make use of large amounts of computing resources and time.

When the ML model 316 is used to perform an assessment, new data 318 is provided as an input to the ML model 316, and the ML model 316 generates the assessment 320 as output. For example, when a prediction score is obtained to measure the probability of buying a product within a defined time window, the machine-learning program utilizes the information about the user and the event history to calculate the propensity to buy score.

Figure 4:
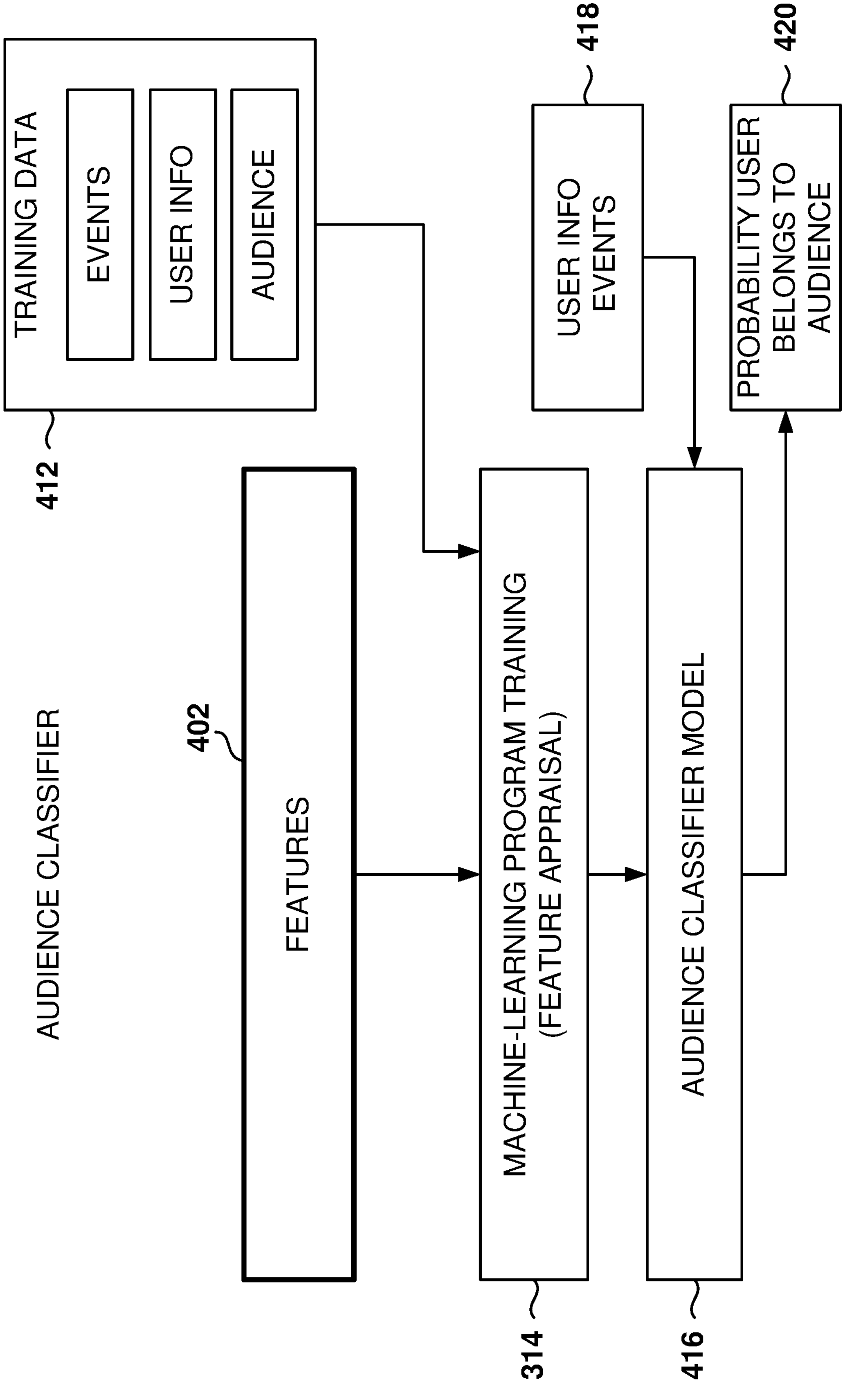
FIG. 4 illustrates the use of the audience classifier model, according to some example embodiments.

FIG. 4 illustrates the use of the audience-classifier model 416, according to some example embodiments. An audience defines a kind of user based on one or more parameters. The parameters may be configured by the administrator based on requirements. For example, the audience may include those users that spend a minimum defined amount over a year, or the audience may include users that are predicted to spend a certain threshold amount over the period encompassing the next six months, or the audience may include people over a certain age, etc.

The audience-classifier model 416 generates a score (e.g., between 0 and 1) with a probability that a certain user or persona ID belongs to the audience.

The training data 412 includes events and user information, such as events captured over the last year, where each event includes information about the user associated with the event. Examples include user 1234 visited a webpage, user 2222 purchased a computer, user 1111 added a product to a virtual shopping cart, and so on.

The features 402 include features associated with the events and the users. A detailed example is provided below with reference to FIG. 10. In some examples, a first set of features are associated with recency, which defines a timing of the event. For example, how long it has been since the user took certain actions, such as a page view, an order, or added something to a cart. Another set of features are associated with frequency, that is, how often the user has performed a certain action. For example, how much the user has spent in the last year.

The input 418 to the audience-classifier model 416 includes user information (e.g., user identifier) and event information for the corresponding user (e.g., statistical data compiled for the user over a predefined period of time, such as the last 30 days). In some embodiments, the input 418 is embedded into a vector of numerical values, that is, the user information and the event information are encoded into numbers and then the input 418 is created by concatenating the different numerical values.

The output 420 of the audience-classifier model 416 is a score, which is a probability that a user belongs to the audience. A threshold probability is configurable, such that probabilities over or matching the threshold probability indicate that the user belongs to the audience, and the user does not belong to the audience if the score is below the threshold probability.

In some example embodiments, the output 420 includes a vector comprising: user ID, one or more user emails for the user ID, anonymous IDs (associated with the same user ID), predicted class ID (e.g., audience 5), and the probability that the user ID belongs to the audience.

Figure 5:
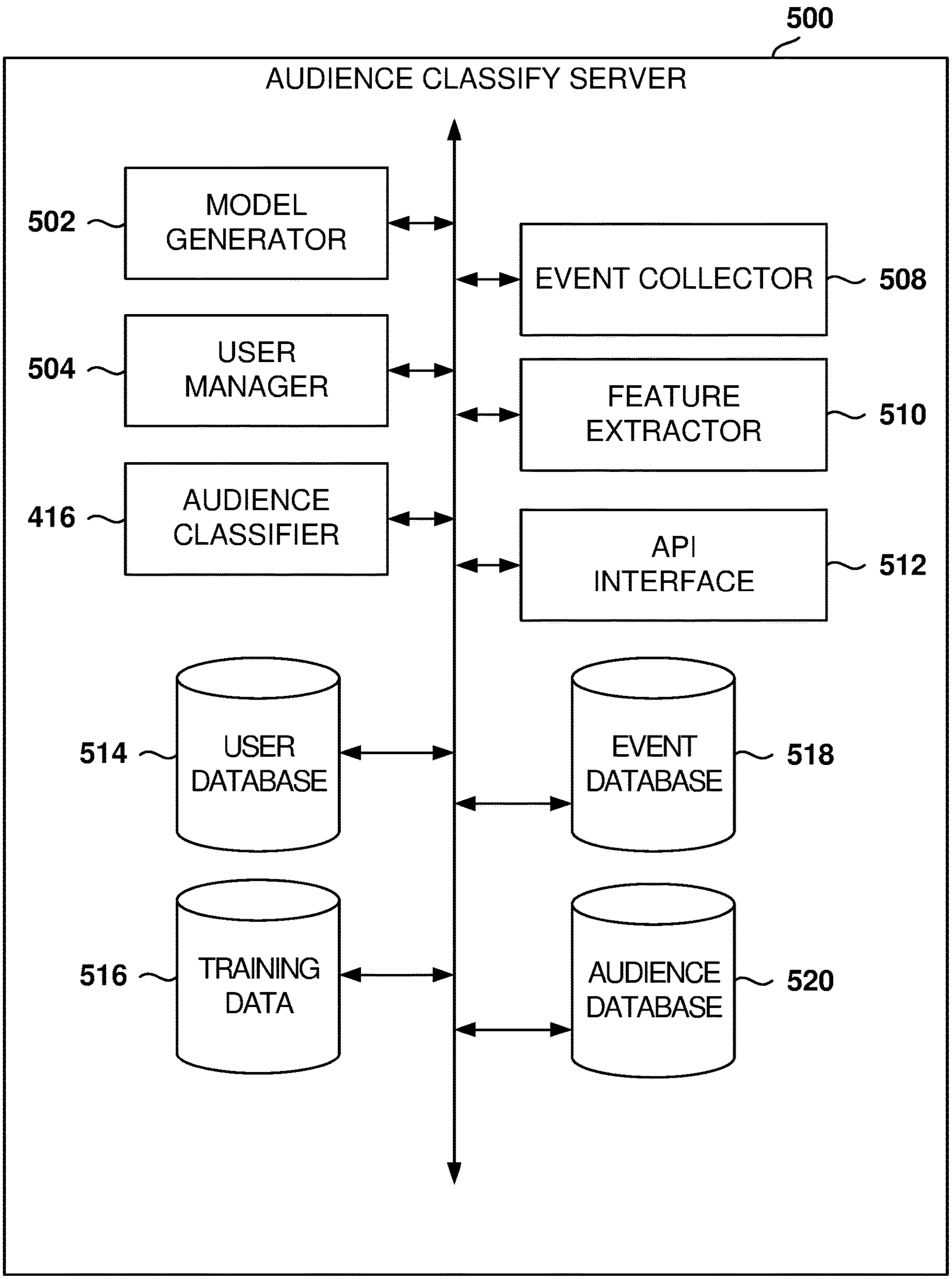
FIG. 5 illustrates an audience-classify server for implementing example embodiments.

FIG. 5 illustrates an audience-classify server 500 for implementing example embodiments. The audience-classify server 500 includes a model generator 502, a user manager 504, the audience-classifier model 416 of FIG. 4, an event collector 508, a feature extractor 510, an API interface 512, and a plurality of databases or data stores. The databases include a user database 514, an event database 518, a training-data database 516, and an audience database 520.

The model generator 502 generates the model based on the training data stored in the training-data database 516. For example, the model generator generates the audience-classifier model 416. The user manager 504 manages information associated with users and personas, such as traits identified for each persona.

The model generator 502 provides a generalizable framework that could be used across multiple customers that is easy to use by the customers. The audience-classify server 500 performs the operations associated with the generation of the training data and the models. The customer is able to customize the solution by identifying parameters such as products, website, etc., and the model generator will provide the custom model for the customer. In other cases, the training data is generated for the customer so the customer can choose to use any machine-learning program to generate the models.

The event collector 508 gathers events associated with the users. For example, the event collector 508 receives events from activity-monitoring server 110 of FIG. 1. The feature extractor 510 builds the features used by the models, such as user information and event information. The feature extractor 510 and best the information into vectors used by the model generator 502. In some examples, the feature extractor 510 normalizes the currency associated with some events, such as purchases. For example, all purchases are converted to one same currency so all the events refer to the same scale of spending.

The API interface 512 provides a programmatic interface to access information provided by the audience-classify server 500, such as user information and persona information.

The user database 514 stores the information about users and personas, and the event database 518 stores the collected events. Further, the training-data database 516 stores the training data, and the audience database 520 stores the audience information, such as the categorization of users into audiences, as well as audience parameters used to define when users belong to one or more audiences.

It is noted that the embodiments illustrated in FIG. 5 are examples and do not describe every possible embodiment. Other embodiments may utilize different components, additional components, fewer components, combine the functionality of two or more components into one, etc. The embodiments illustrated in FIG. 5 should therefore not be interpreted to be exclusive or limiting, but rather illustrative.

Figure 6:
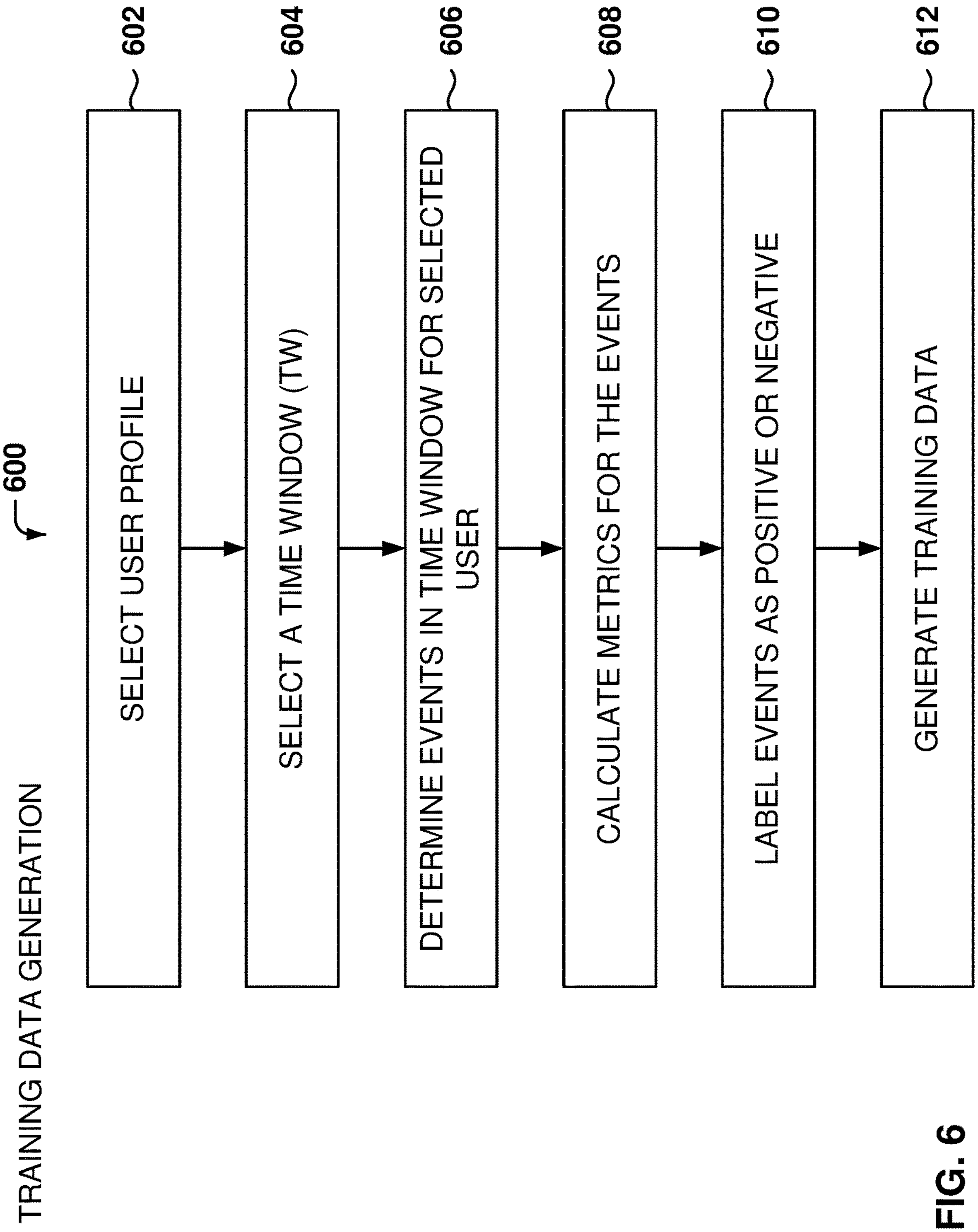
FIG. 6 is a flowchart of a method for generating training data, according to some example embodiments.

FIG. 6 is a flowchart of a method 600 for generating training data, according to some example embodiments. While the various operations in this flowchart are presented and described sequentially, one of ordinary skill will appreciate that some or all of the operations may be executed in a different order, be combined or omitted, or be executed in parallel.

The training data may be used for multiple models, such as a model to determine propensity and forecasting. In some example embodiments, propensity is a binary classification problem described by a labeling function $f$ where the output of propensity for $f$ is the probability that an event matching a given event x occurs within a selected Time Window (TW). In some cases, $f(x)$ describes a set of conditions on events, such as "event type"="purchase" and "item"="Nike". Given $f(x)$ and the desired time window, the training data is generated from the historical user data. Forecasting refers to calculating an estimate of the purchases made by a group of users, such as an audience.

At operation 602, a profile of a user is selected. From operation 602, the method 600 flows to operation 604 to select a TW. The time window defines the period of time for selecting events for the training data.

From operation 604, the method 600 flows to operation 606 to determine the events within the time window for the selected user.

From operation 606, the method 600 flows to operation 608 to calculate metrics associated with the events determined at operation 606. For example, the metrics may include statistical values associated with events, such as the number of purchases within the time window. Some metric examples are provided below with reference to FIG. 10.

At operation 610, each event is labeled as a positive or a negative sample, that is, whether this particular event is associated with a category associated with the label. For every event x occurring in the TW, $f(x)$ is evaluated. If any event returns an $f(x)$ value of true, then this is a positive example, otherwise it is a negative example.

In some embodiments, the label is for a user belonging to an audience category. The $f(x)$ for labeling the audience type may be customized by the user, such as by including a rule to determine if the user belongs to the audience. For example, a rule may define that a user belongs to an audience if the user has purchased goods over a certain time window with a value exceeding a threshold valued, but other rules may also be included, such as number of visits to the website, area code, number of additions to the electronic shopping cart, user is a business or not, etc.

From operation 610, the method 600 flows to operation 612 to generate the training data that is used to train the model. The training data includes the labeled events calculated at operation 610.

At inference time, a set of events are gathered for a certain period (e.g., last 30 days, last week, etc.), and then the events become inputs for the model that generates an estimate based on the events, such as the propensity of a given user to purchase certain product within a certain time frame (e.g., within 30 days).

Figure 7:
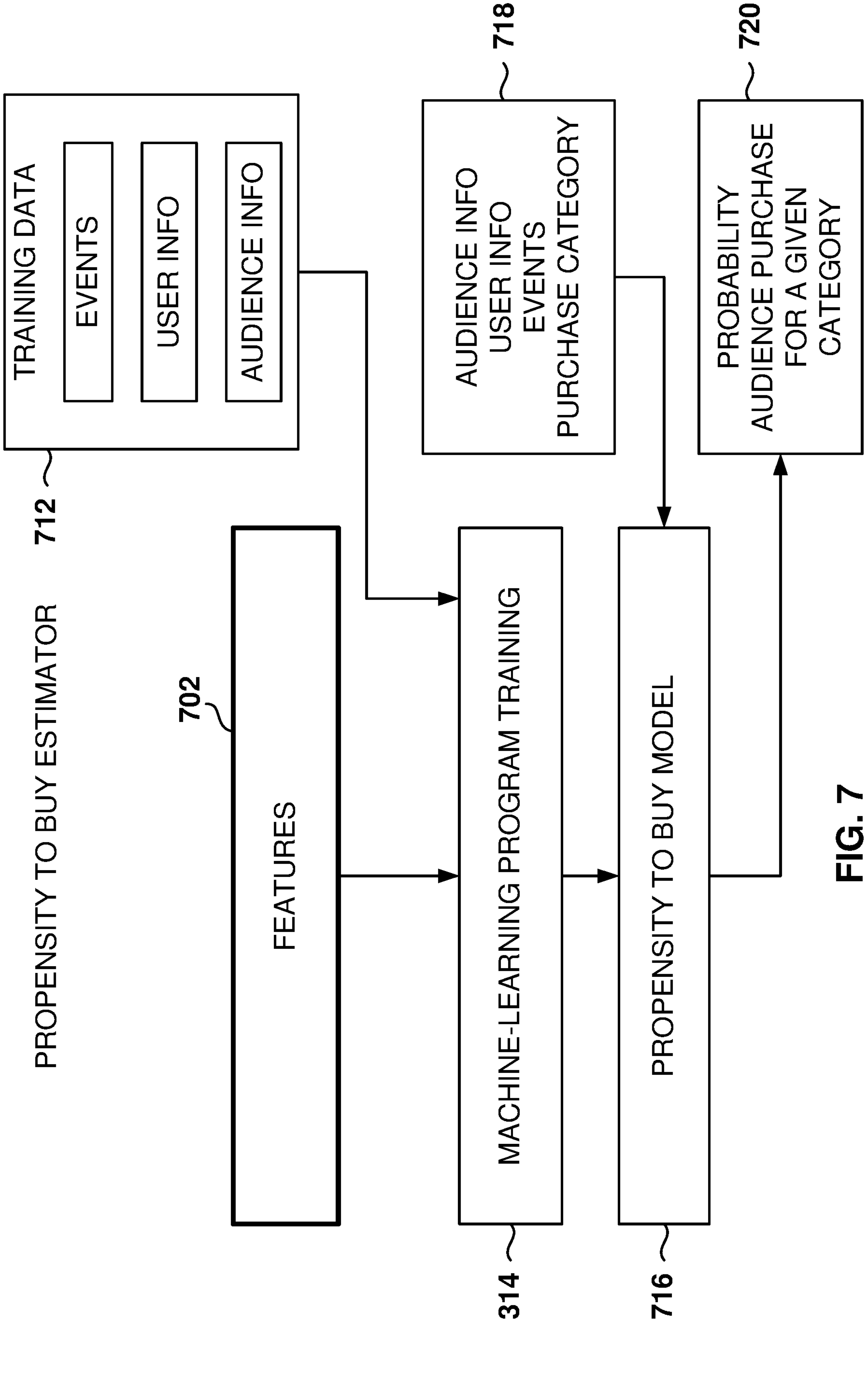
FIG. 7 illustrates the use of the propensity-to-buy model, according to some example embodiments.

FIG. 7 illustrates the use of the propensity-to-buy model 716, according to some example embodiments. In some example embodiments, the features 702 for the propensity-to-buy model 716 include the same features as the audience-classifier model 416, such as the features described below with reference to FIG. 10. In other embodiments, the features are a subset of the propensity-to-buy model features and may also include additional features.

The training data 712 for the propensity-to-buy model 716 includes information on events, user information, and audience info. That is, the propensity-to-buy model 716 also considers the audience category. The audience information includes labels that identify the audience (or audiences) that a user is associated with. For example, a feature vector may include Boolean values and each value indicates if the user belongs to the corresponding audience (e.g., value of 1) or not (e.g., value of 0).

The inputs 718 to the propensity-to-buy model 716 include information about events taking place within a certain time window, (e.g., last 30 days, last week). The information includes the events, the audience information for the events (e.g., the event was associated with a certain audience), the user information associated with the events, and the purchase category. In some embodiments, the user information is not an input and the prediction is generated for the identified audience.

The propensity-to-buy model 716 may be utilized to determine the propensity for one user or for an audience. In the illustrated example, the propensity-to-buy model 716 determines a probability 720 of purchases in a given category (e.g., product, product line, website) for a given audience within a predetermined period of time. Thus, the customer can identify high-value users and audiences that are potentially close to making a purchase.

In some example embodiments, a batch of requests are made for all the audience categories and the results stored in a database. Further, multiple requests may also be made by an audience and product category to obtain purchase predictions for the product categories.

In one example, the outputs of the propensity-to-buy model 716 are combined to determine a total value of a user's billing events over a predetermined future time period. Also, the total value of an audience's billing events over a predetermined future time period may be calculated.

Figure 8:
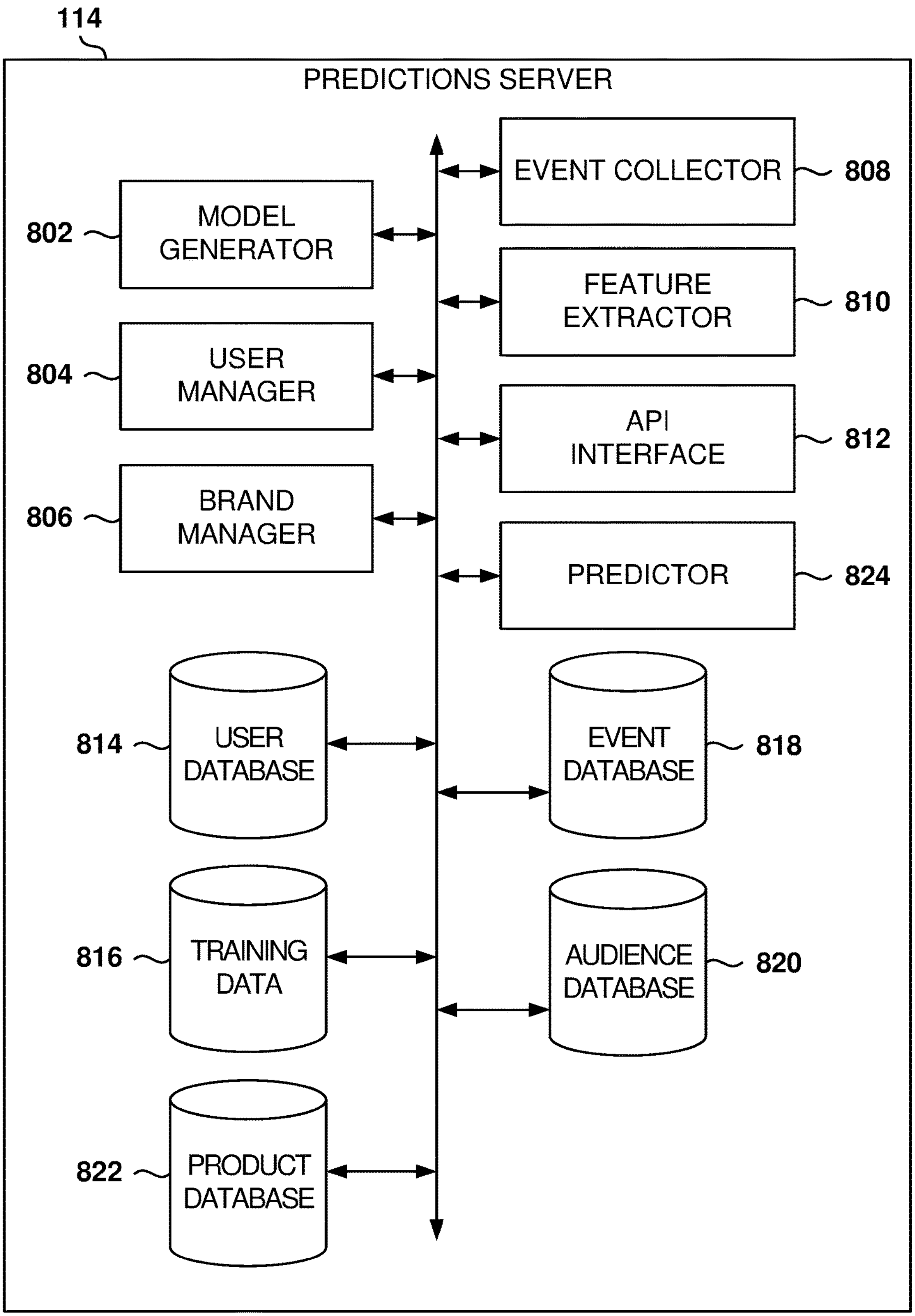
FIG. 8 illustrates a predictions server for implementing example embodiments.

FIG. 8 illustrates a predictions server 114 of FIG. 1 for implementing example embodiments. The predictions server 114 includes a model generator 802, a user manager 804, a brand manager 806, an event collector 808, a feature extractor 810, an API interface 812, a predictor 824, and a plurality of databases or data stores. The databases include a user database 814, an event database 818, a training-data database 816, an audience database 820, and a product database 822.

The model generator 802 generates the model based on the training data stored in the training-data database 816. For example, the model generator generates the propensity-to-buy model 716. The user manager 804 manages information associated with users and personas, such as traits identified for each persona.

The model generator 802 provides a generalizable framework that could be used across multiple customers that is easy to use by the customers. The predictions server 114 performs the operations associated with the generation of the training data and the models. The customer can customize the solution by identifying parameters such as products, website, etc., and the model generator will provide the custom model for the customer. In other cases, the training data is generated for the customer so the customer can choose to use any machine-learning program to generate the models.

The brand manager 806 manages the information associated with products offered by a company. Some events include information regarding the products managed by the brand manager 806.

The event collector 808 gathers events associated with the users. For example, the event collector 808 receives events from activity-monitoring server 110 of FIG. 1. The feature extractor 810 builds the features used by the models, such as user information, audience information, and event information. The feature extractor 810 and best the information into vectors used by the model generator 802. In some examples, the feature extractor 810 normalizes the currency associated with some events, such as purchases. For example, all purchases are converted to one same currency so all the events refer to the same scale of spending.

The API interface 812 provides a programmatic interface to access information provided by the predictions server 114, such as user information and predictions information.

The user database 814 stores the information about users and personas, and the event database 818 stores the collected events. Further, the training-data database 816 stores the training data, and the audience database 820 stores the audience information, such as the categorization of users into audiences, as well as audience parameters used to define when users belong to one or more audiences. The product database 822 includes information about product and product purchases.

It is noted that the embodiments illustrated in FIG. 8 are examples and do not describe every possible embodiment. Other embodiments may utilize different components, additional components, fewer components, combine the functionality of two or more components into one, etc. The embodiments illustrated in FIG. 8 should therefore not be interpreted to be exclusive or limiting, but rather illustrative.

Figure 9:
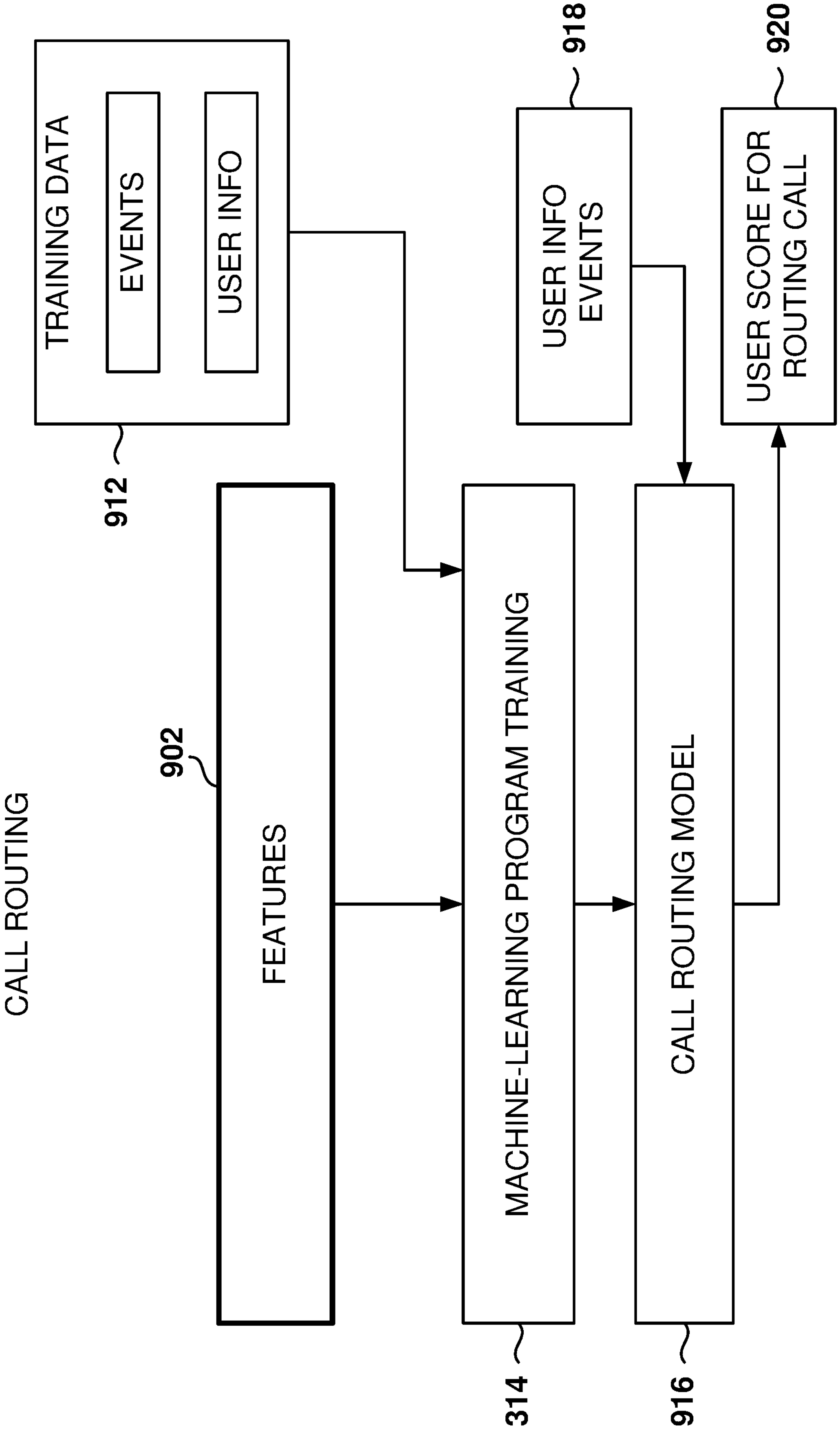
FIG. 9 illustrates the use of the call-routing model, according to some example embodiments.

FIG. 9 illustrates the use of the call-routing model 916, according to some example embodiments. When a call is received at a support center, information available about the call (e.g., phone number, name of user, email address, IP address, recent events associated with the user) is analyzed to prioritize how the call is routed to support agents. The call-routing model 916 uses the available information on user information and events 918 as input and generates a user score 920 to route the call. For example, the user score is a real number between 0 and 1, and the higher the user score, the more important this user is to the company associated with the support center. Other embodiments may utilize different values, such as an integer score between 0 and 100.

Most customer centers use a first-in first-served policy to respond to calls; that is, all customers are put on the same queue. However, many company wish to give higher priority to some clients, like clients that do frequent business with the company, or clients that are considering a product purchase. By having the ability to route support cost intelligently, companies are able to improve customer satisfaction for important clients and improve sales by providing better service to buying clients.

The features 902 may be the same as the ones used for the audience-classifier model 416 of FIG. 4 and the propensity-to-buy-model 716 of FIG. 7 or may include a subset of the same features or additional features related to support center operations. Some feature examples are provided below with reference to FIG. 10.

The training data 912 may include event information, user information, and audience information. In some embodiments, the event information is not used. The audience information includes a label indicating which events and which users are associated with the audience type; that is, whether the user belongs to the audience. For each user, an audience level value indicates if the user belongs to the audience (e.g., a value of 1 indicates that the user belongs to the audience, and a value of 0 indicates that the user does not belong to the audience).

At inference time, the call-routing model 916 uses as input information on the user and about recent events (this is optional) and generates the user score 920.

The support center implements rules for routing calls based on the user score 920. For example, users with higher scores are given priority over other users with lower scores to reduce or eliminate wait time.

The user of intelligent profile attributes (e.g., future spend and product usage), are building blocks that users can build upon. Users can build their own models based on the data provided by the system that includes activity monitoring, persona consolidation, and predictions. The same attributes can be used for use cases in user marketing, audience marketing, support call management, forecasting sales, and so on.

FIG. 10 is a table 1002 showing some example features for use in machine learning. The features used by the model include all or a subset of the following event-related features:

- Number of orders in the feature time window (n_orders);
- Number of items ordered in the feature time window (n_items_ordered);
- Number of items added to cart in the feature time window (n_items_in_cart);
- Number of items in wish list of the user (n_items_in_list);
- Number of page views in the feature time window (n_page_views);
- Number of cart views in the feature time window (n_cart_iews);
- Days since last order (from the last day of the feature time window) (d_since_order);
- Days since last page view (from the last day of the feature time window) (d_since_page_view);
- Days since last cart addition (from the last day of the feature time window) (d_since_cart_add);
- Days since last wish-list addition (from the last day of the feature time window) (d_since_list_add);
- Total spending in feature window normalized by currency (total_value);
- Value of last order normalized by currency (last_order_value); and
- Total value of items added to the cart normalized by currency (total_cart_value).

The features recited above are statistical values calculated for the feature window (e.g., last thirty days, last six months, last week, etc.). The system periodically updates these statistical values over time to take into account new events, and optionally, obsoleting some of the older events.

In addition to these features, the model may include features associated with the user, including:

- Name of the user;
- User login;
- Email address of the user;
- Telephone number of the user;
- IP address used by the user to access website;
- Postal address of the user; and
- Age or age bracket.

Other embodiments may include additional information about the user, such as education, number of children, relatives, etc.

The users of the system are able to opt out from having user information, or a subset of the user information, utilized to make predictions. Further, the user information may be anonymized as needed to protect user information.

Other features that may be used by the model refer to product information, such as:

- Product identifier;
- Product description;
- List price;
- Product sales;
- Product family;
- Traffic metrics for visits to product webpage;
- Product release date; and
- Product version.

Other product available information may be also included as available.

Additionally, audience-related features may be used, such as:

- Audience identifier;
- Audience parameters (e.g., minimum spending level per year); and
- Number of users in the audience category.

The system may also use additional audience-related features as traced by the system.

It is noted that the embodiments illustrated in FIG. 10 are examples and do not describe every possible embodiment. Other embodiments may utilize different features, a subset of the features, additional features, etc. The embodiments illustrated in FIG. 10 should therefore not be interpreted to be exclusive or limiting, but rather illustrative.

Figure 11:
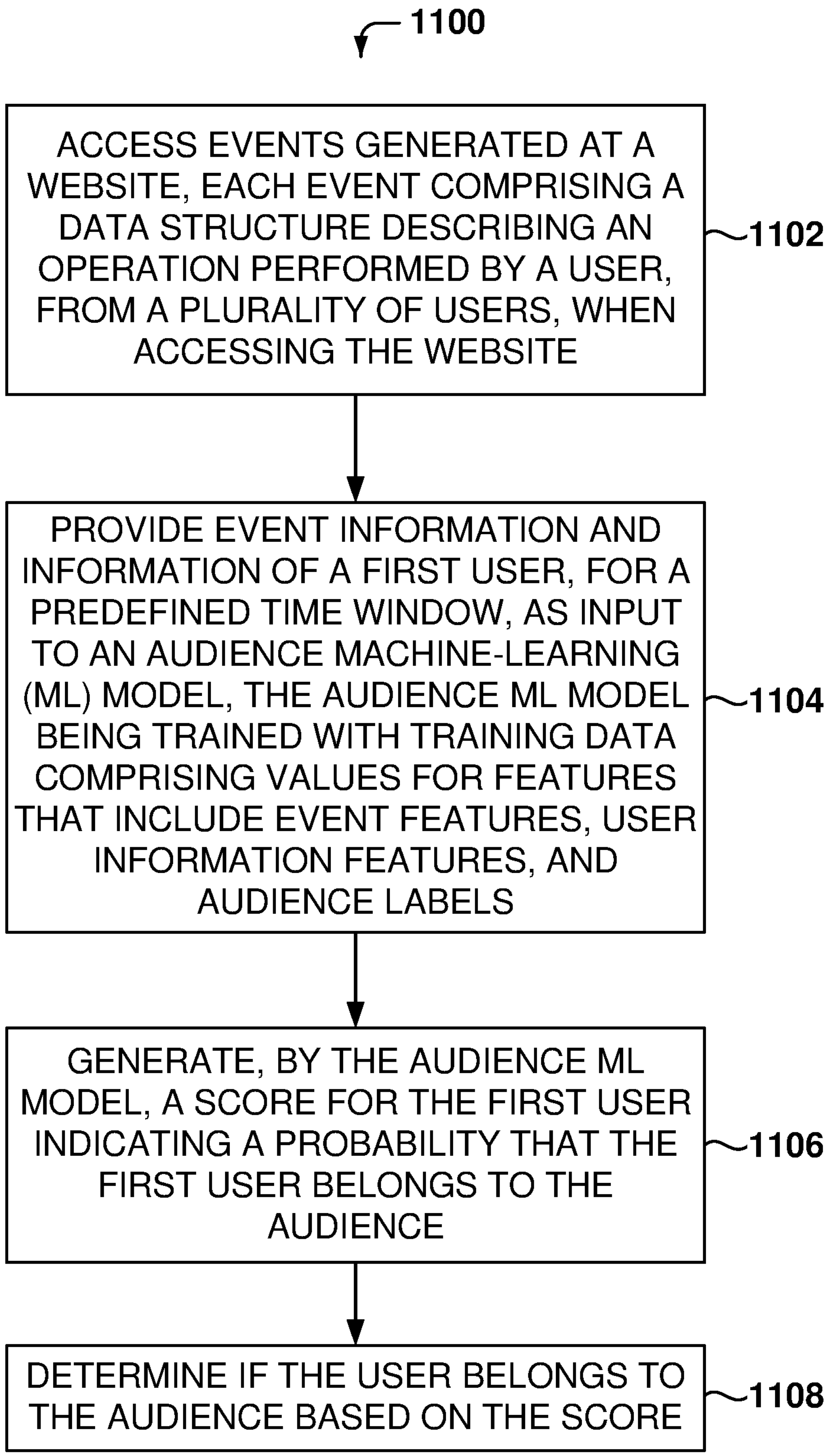
FIG. 11 is a flowchart of a method for estimating if a user belongs to an audience category, according to some example embodiments.

FIG. 11 is a flowchart of a method 1100 for estimating if a user belongs to an audience category, according to some example embodiments. While the various operations in this flowchart are presented and described sequentially, one of ordinary skill will appreciate that some or all of the operations may be executed in a different order, be combined or omitted, or be executed in parallel.

Operation 1102 is for accessing, by one or more processors, events generated at a website. Each event comprises a data structure describing an operation performed by a user, from a plurality of users, when accessing the website.

From operation 1102, the method 1100 flows to operation 1104 to provide event information and information of a first user for a predefined time window, as input to an audience machine-learning (ML) model. The audience ML model has been trained with training data comprising values for features that include event features, user information features, and audience labels.

From operation 1104, the method 1100 flows to operation 1106 for generating, by the audience ML model, a score for the first user indicating a probability that the first user belongs to the audience.

From operation 1106, the method 1100 flows to operation 1108 to determine if the user belongs to the audience based on the score.

Although some embodiments are presented with reference to events generated at a website, the same principles may be used for other types of user interactions. For example, a user may receive a print advertisement with a code to access a promotional sale, and the user calls the support center to make a purchase using the promotional code. The code and other data of the user (e.g., name, phone number) may be used by the model to calculate the probability that the user may belong to the audience.

In some cases, the information of the user calling the support center may be enhanced with other information available for the user (e.g., retrieving name and email address of the user based on the caller ID of the phone call), to use this as input for the model that calculates the score for belonging to a particular audience.

In one example, the event features are selected from a group comprising number of orders in a feature window (FW), number of items ordered in FW, number of items added to cart in FW, number of page view in FW, number of cart views in FW, days since last order, and total value of purchases in FW.

In one example, the user information features are selected from a group comprising email of the user, telephone number of the user, and internet protocol (IP) address of a device utilized by the user.

In one example, the method 1100 further comprises calculating the audience labels in the training data based on a predefined rule.

In one example, the events are selected from a group comprising accessing a product webpage, ordering a product, adding a product to an electronic shopping cart, adding a product to a user wish list, and viewing the electronic shopping cart.

In one example, the method 1100 further comprises analyzing the events generated at the website; and, determining a persona identifier for each event, each persona identifier associated with a user that generated events with one or more user traits, the traits comprising email address, IP address, and telephone number.

In one example, the method 1100 further comprises generating a forecast for the users from the plurality of users that belong to the audience.

Another general aspect is for a system that includes a memory comprising instructions and one or more computer processors. The instructions, when executed by the one or more computer processors, cause the one or more computer processors to perform operations comprising: accessing events generated at a website, each event comprising a data structure describing an operation performed by a user, from a plurality of users, when accessing the website; providing event information and information of a first user, for a predefined time window, as input to an audience machine-learning (ML) model, the audience ML model being trained with training data comprising values for features that include event features, user information features, and audience labels; generating, by the audience ML model, a score for the first user indicating a probability that the first user belongs to the audience; and determining if the user belongs to the audience based on the score.

In yet another general aspect, a machine-readable storage medium (e.g., a non-transitory storage medium) includes instructions that, when executed by a machine, cause the machine to perform operations comprising: accessing events generated at a website, each event comprising a data structure describing an operation performed by a user, from a plurality of users, when accessing the website; providing event information and information of a first user, for a predefined time window, as input to an audience machine-learning (ML) model, the audience ML model being trained with training data comprising values for features that include event features, user information features, and audience labels; generating, by the audience ML model, a score for the first user indicating a probability that the first user belongs to the audience; and determining if the user belongs to the audience based on the score.

Figure 12:
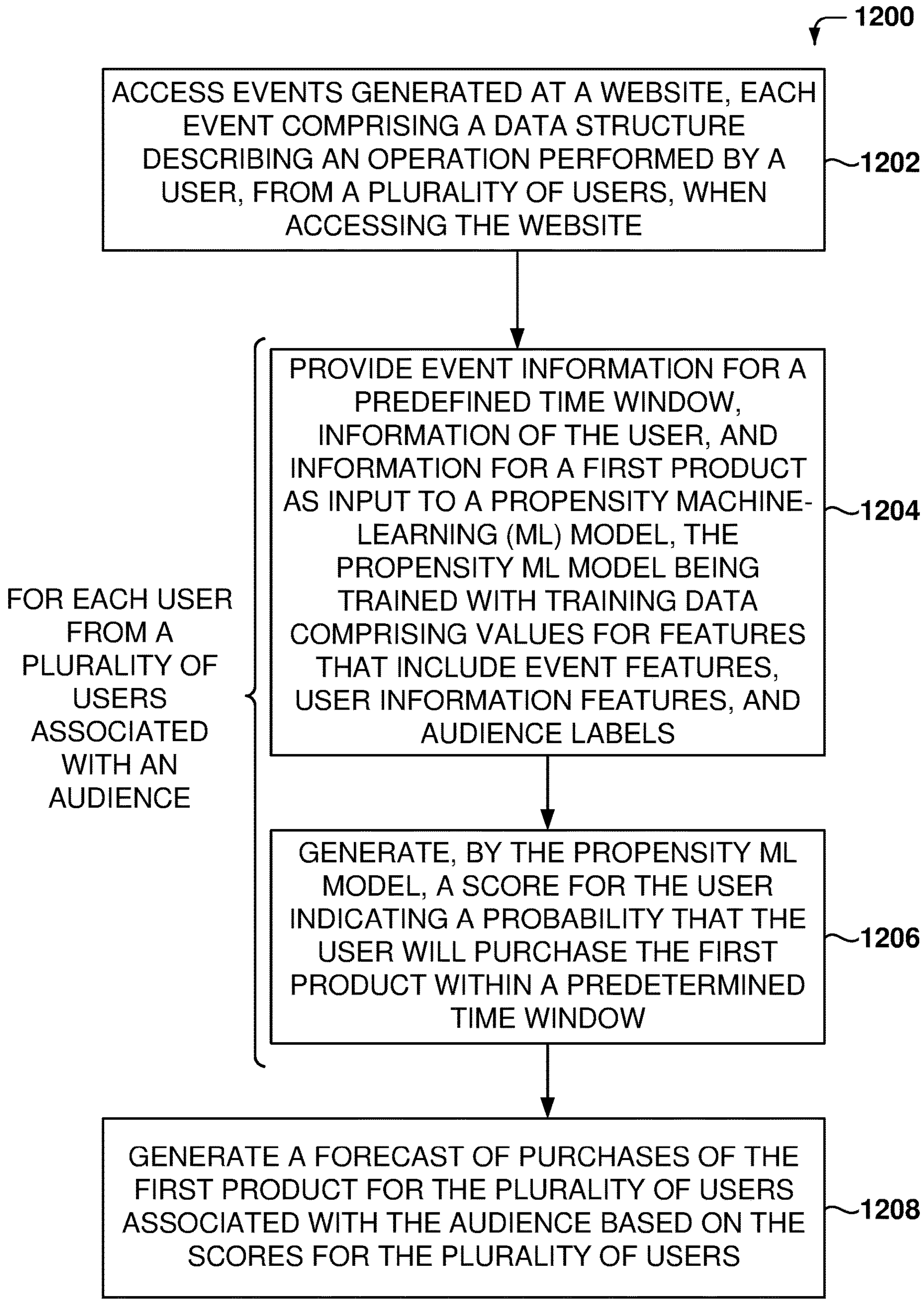
FIG. 12 is a flowchart of a method for estimating the propensity to buy a product or service, according to some example embodiments.

FIG. 12 is a flowchart of a method 1200 for estimating the propensity to buy a product or service, according to some example embodiments. While the various operations in this flowchart are presented and described sequentially, one of ordinary skill will appreciate that some or all of the operations may be executed in a different order, be combined or omitted, or be executed in parallel.

Operation 1202 is for accessing, by one or more processors, events generated at a website. Each event comprises a data structure describing an operation performed by a user, from a plurality of users, when accessing the website.

From operation 1202, the method 1200 flows to operation 1204. Operations 1204 and 1206 are performed for each user from a plurality of users associated with an audience. Operation 1204 is for providing event information for a predefined time window, information of the user, and information for a first product as input to a propensity machine-learning (ML) model. The propensity ML model is trained with training data comprising values for features that include event features, user information features, and audience labels.

From operation 1204, the method 1200 flows to operation 1206 for generating, by the propensity ML model, a score for the user indicating a probability that the user will purchase the first product within a predetermined time window.

After performing operation 1206 for a last user, the method 1200 flows to operation 1208 for generating a forecast of purchases of the first product for the plurality of users associated with the audience based on the scores.

In one example, the event features are selected from a group comprising number of orders in a feature window (FW), number of items ordered in FW, number of items added to cart in FW, number of page view in FW, number of cart views in FW, days since last order, and total value of purchases in FW.

In one example, the user information features are selected from a group comprising email of the user, telephone number of the user, and internet protocol (IP) address of a device utilized by the user.

In one example, the events are selected from a group comprising accessing a product webpage, ordering a product, adding a product to an electronic shopping cart, adding a product to a user wish list, and viewing the electronic shopping cart.

In one example, the method 1200 further comprises accessing a plurality of historic events; providing an audience label for each user associated with the plurality of historic events; calculating metrics for the plurality of historic events; and generating the training data based on the plurality of historic events, the audience labels, and the calculated metrics.

In one example, the method 1200 further comprises analyzing the events generated at the website; and determining a persona identifier for each event, each persona identifier associated with a user that generated events with one or more user traits, the user traits comprising email address, IP address, and telephone number.

In one example, the method 1200 further comprises providing an application programming interface (API) by a predictions server, the API providing options to access prediction data.

Another general aspect is for a system that includes a memory comprising instructions and one or more computer processors. The instructions, when executed by the one or more computer processors, cause the one or more computer processors to perform operations comprising: accessing events generated at a website, each event comprising a data structure describing an operation performed by a user, from a plurality of users, when accessing the website; for each user from a plurality of users associated with an audience: providing event information for a predefined time window, information of the user, and information for a first product as input to a propensity machine-learning (ML) model, the propensity ML model being trained with training data comprising values for features that include event features, user information features, and audience labels; and generating, by the propensity ML model, a score for the user indicating a probability that the user will purchase the first product within a predetermined time window; and generating a forecast of purchases of the first product for the plurality of users associated with the audience based on the scores.

In yet another general aspect, a machine-readable storage medium (e.g., a non-transitory storage medium) includes instructions that, when executed by a machine, cause the machine to perform operations comprising: accessing events generated at a website, each event comprising a data structure describing an operation performed by a user, from a plurality of users, when accessing the web site; for each user from a plurality of users associated with an audience: providing event information for a predefined time window, information of the user, and information for a first product as input to a propensity machine-learning (ML) model, the propensity ML model being trained with training data comprising values for features that include event features, user information features, and audience labels; and generating, by the propensity ML model, a score for the user indicating a probability that the user will purchase the first product within a predetermined time window; and generating a forecast of purchases of the first product for the plurality of users associated with the audience based on the scores.

Figure 13:
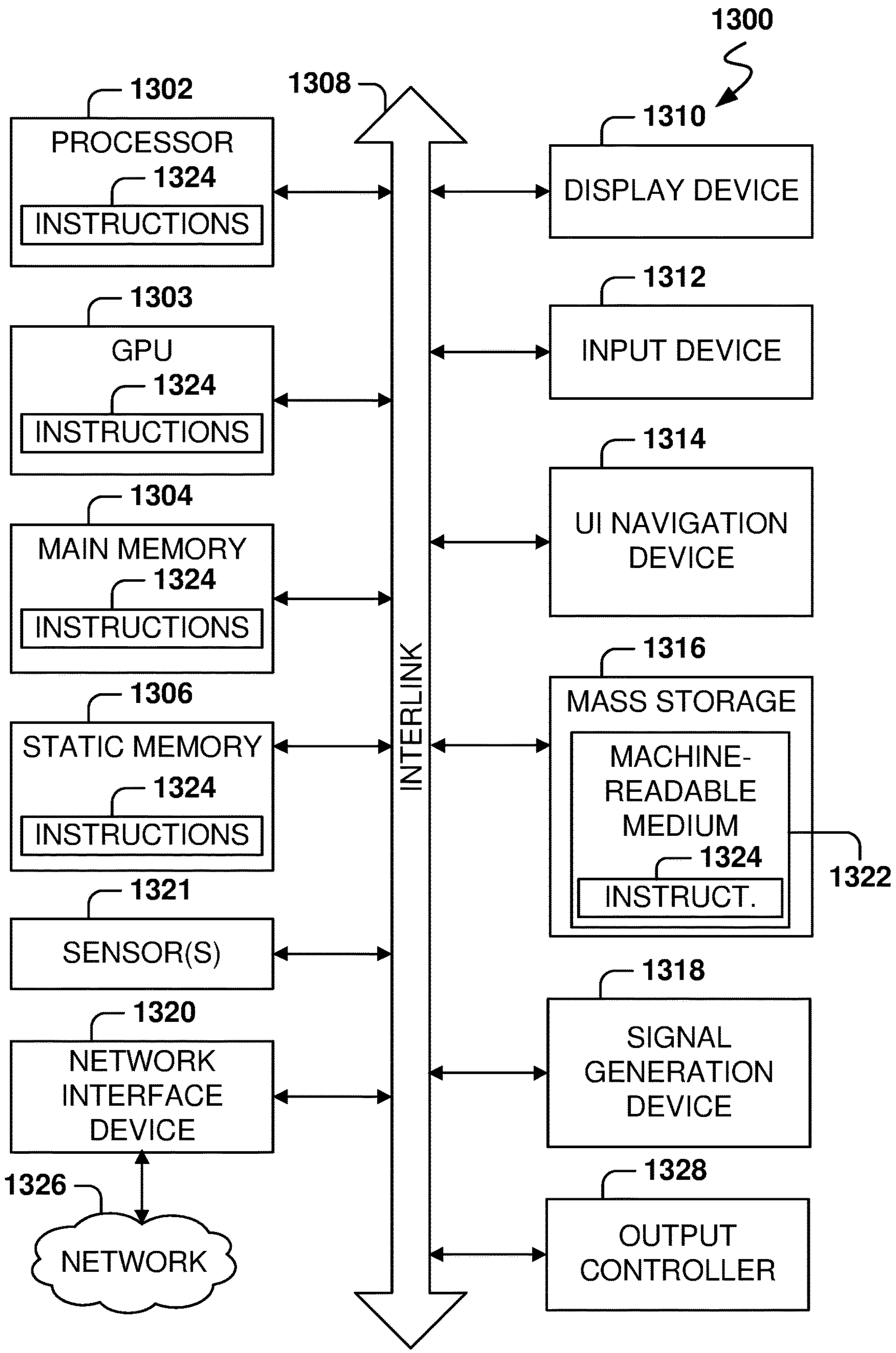
FIG. 13 is a block diagram illustrating an example of a machine upon or by which one or more example process embodiments described herein may be implemented or controlled.

FIG. 13 is a block diagram illustrating an example of a machine 1300 upon or by which one or more example process embodiments described herein may be implemented or controlled. In alternative embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in a peer-to-peer (P2P) (or other distributed) network environment. Further, while only a single machine 1300 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1300 may include a hardware processor 1302 (e.g., a central processing unit (CPU), a hardware processor core, or any combination thereof), a graphics processing unit (GPU) 1303, a main memory 1304, and a static memory 1306, some or all of which may communicate with each other via an interlink (e.g., bus) 1308. The machine 1300 may further include a display device 1310, an alphanumeric input device 1312 (e.g., a keyboard), and a user interface (UI) navigation device 1314 (e.g., a mouse). In an example, the display device 1310, alphanumeric input device 1312, and UI navigation device 1314 may be a touch screen display. The machine 1300 may additionally include a mass storage device (e.g., drive unit) 1316, a signal generation device 1318 (e.g., a speaker), a network interface device 1320, and one or more sensors 1321, such as a Global Positioning System (GPS) sensor, compass, accelerometer, or another sensor. The machine 1300 may include an output controller 1328, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1316 may include a machine-readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within the static memory 1306, within the hardware processor 1302, or within the GPU 1303 during execution thereof by the machine 1300. In an example, one or any combination of the hardware processor 1302, the GPU 1303, the main memory 1304, the static memory 1306, or the mass storage device 1316 may constitute machine-readable media.

While the machine-readable medium 1322 is illustrated as a single medium, the term "machine-readable medium" may include a single medium, or multiple media, (e.g., a centralized or distributed database, and/or associated caches and servers) configured to store the one or more instructions 1324.

The term "machine-readable medium" may include any medium that is capable of storing, encoding, or carrying instructions 1324 for execution by the machine 1300 and that cause the machine 1300 to perform any one or more of the techniques of the present disclosure, or that is capable of storing, encoding, or carrying data structures used by or associated with such instructions 1324. Non-limiting machine-readable medium examples may include solid-state memories, and optical and magnetic media. In an example, a massed machine-readable medium comprises a machine-readable medium 1322 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1324 may further be transmitted or received over a communications network 1326 using a transmission medium via the network interface device 1320.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:

generating, by one or more processors, at least one terabyte of training data that comprise machine-learning feature vectors of values for features that include event features, user information features, audience labels, and product features;

training, by the one or more processors, a propensity-to-buy machine-learning (ML) model to perform a binary classification that outputs a probability of a persona purchasing a product within a predetermined time window, the training of the propensity-to-buy ML model being based on the generated at least one terabyte of training data that comprise the machine-learning feature vectors of values for the features that include the event features, the user information features, the audience labels, and the product features;

tracking, by the one or more processors, events that correspond to users among a plurality of users;

determining, by the one or more processors, a set of tracked events that correspond to a single persona that represents a single user corresponding to multiple devices and multiple identifiers among the users;

accessing, by the one or more processors, further events, each further event comprising a data structure describing an operation performed by the single persona;

providing, by the one or more processors, event information of the further events for a predefined time window, persona information of the single persona, and product information for a first product as input to the propensity-to-buy ML model trained to perform the binary classification based on the at least one terabyte of training data that comprise the values for the features that include the event features, the user information features, the audience labels, and the product features;

generating, by the propensity-to-buy ML model, a score for the single persona indicating a probability that the single persona will purchase the first product within a predetermined time window; and generating, by the one or more processors, a forecast of purchases of the first product for a plurality of personas based on scores generated by the propensity-to-buy ML model for the plurality of personas.

2. The method as recited in claim 1, wherein the event features are selected from a group consisting of a number of orders in a feature window (FW), a number of items ordered in the FW, a number of items added to a cart in the FW, a number of page views in the FW, a number of cart views in the FW, a number of days since a last order, and a total value of purchases in the FW.

3. The method as recited in claim 1, wherein the user information features are selected from a group consisting of an email of the single persona, a telephone number of the single persona, and an internet protocol (IP) address of a device utilized by the single persona.

4. The method as recited in claim 1, wherein the tracked events are selected from a group consisting of accessing a product webpage, ordering a product, adding a product to an electronic shopping cart, adding a product to a user wish list, and viewing the electronic shopping cart.

5. The method as recited in claim 1, further comprising:

accessing a plurality of historic events;

providing an audience label for each user associated with the plurality of historic events; and calculating metrics for the plurality of historic events; and wherein:

the at least one terabyte of training data is generated based on the plurality of historic events, the audience labels, and the calculated metrics.

6. The method as recited in claim 1, further comprising:

analyzing the tracked events that correspond to the users; and determining a persona identifier for each tracked event, each persona identifier being associated with a corresponding single user with one or more user traits comprising at least one of an email address, an IP address, and a telephone number.

7. The method as recited in claim 1, further comprising:

providing an application programming interface (API) by a predictions server, the API providing options to access prediction data.

8. A system comprising:

a memory comprising instructions; and one or more computer processors, wherein the instructions, when executed by the one or more computer processors, cause the system to perform operations comprising:

generating at least one terabyte of training data that comprise machine-learning feature vectors of values for features that include event features, user information features, audience labels, and product features;

training a propensity-to-buy machine-learning (ML) model to perform a binary classification that outputs a probability of a persona purchasing a product within a predetermined time window, the training of the propensity-to-buy ML model being based on the generated at least one terabyte of training data that comprise the machine-learning feature vectors of values for the features that include the event features, the user information features, the audience labels, and the product features;

tracking events that correspond to users among a plurality of users;

determining a set of tracked events that correspond to a single persona that represents a single user corresponding to multiple devices and multiple identifiers among the users;

accessing further events, each further event comprising a data structure describing an operation performed by the single persona;

providing event information of the further events for a predefined time window, persona information of the single persona, and product information for a first product as input to the propensity-to-buy ML model trained to perform the binary classification based on the at least one terabyte of training data that comprise the values for the features that include the event features, the user information features, the audience labels, and the product features;

generating, by the propensity-to-buy ML model, a score for the single persona indicating a probability that the single persona will purchase the first product within a predetermined time window; and generating a forecast of purchases of the first product for a plurality of personas based on scores generated by the propensity-to-buy ML model for the plurality of personas.

9. The system as recited in claim 8, wherein the event features are selected from a group consisting of a number of orders in a feature window (FW), a number of items ordered in the FW, a number of items added to a cart in the FW, a number of page views in the FW, a number of cart views in the FW, a number of days since a last order, and a total value of purchases in the FW.

10. The system as recited in claim 8, wherein the user information features are selected from a group consisting of an email of the single persona, a telephone number of the single persona, and an internet protocol (IP) address of a device utilized by the single persona.

11. The system as recited in claim 8, wherein the tracked events are selected from a group consisting of accessing a product webpage, ordering a product, adding a product to an electronic shopping cart, adding a product to a user wish list, and viewing the electronic shopping cart.

12. The system as recited in claim 8, wherein the instructions further cause the one or more computer processors to perform operations comprising:

accessing a plurality of historic events;

providing an audience label for each user associated with the plurality of historic events; and calculating metrics for the plurality of historic events; and wherein:

the at least one terabyte of training data is generated based on the plurality of historic events, the audience labels, and the calculated metrics.

13. The system as recited in claim 8, wherein the instructions further cause the one or more computer processors to perform operations comprising:

analyzing the tracked events that correspond to the users; and determining a persona identifier for each tracked event, each persona identifier being associated with a corresponding single user with one or more user traits comprising at least one of an email address, an IP address, and a telephone number.

14. The system as recited in claim 8, wherein the instructions further cause the one or more computer processors to perform operations comprising:

providing an application programming interface (API) by a predictions server, the API providing options to access prediction data.

15. A non-transitory machine-readable storage medium including instructions that, when executed by a machine, cause the machine to perform operations comprising:

generating at least one terabyte of training data that comprise machine-learning feature vectors of values for features that include event features, user information features, audience labels, and product features;

training a propensity-to-buy machine-learning (ML) model to perform a binary classification that outputs a probability of a persona purchasing a product within a predetermined time window, the training of the propensity-to-buy ML model being based on the generated at least one terabyte of training data that comprise the machine-learning feature vectors of values for the features that include the event features, the user information features, the audience labels, and the product features;

tracking events that correspond to users among a plurality of users;

determining a set of tracked events that correspond to a single persona that represents a single user corresponding to multiple devices and multiple identifiers among the users;

accessing further events, each further event comprising a data structure describing an operation performed by the single persona;

providing event information of the further events for a predefined time window, persona information of the single persona, and product information for a first product as input to the propensity-to-buy ML model trained to perform the binary classification based on the at least one terabyte of training data that comprise the values for the features that include the event features, the user information features, the audience labels, and the product features;

generating, by the propensity-to-buy ML model, a score for the single persona indicating a probability that the single persona will purchase the first product within a predetermined time window; and generating a forecast of purchases of the first product for a plurality of personas based on scores generated by the propensity-to-buy ML model for the plurality of personas.

16. The non-transitory machine-readable storage medium as recited in claim 15, wherein the event features are selected from a group consisting of a number of orders in a feature window (FW), a number of items ordered in the FW, a number of items added to a cart in the FW, a number of page views in the FW, a number of cart views in the FW, a number of days since a last order, and a total value of purchases in the FW.

17. The non-transitory machine-readable storage medium as recited in claim 15, wherein the user information features are selected from a group consisting of an email of the single persona, a telephone number of the single persona, and an internet protocol (IP) address of a device utilized by the single persona.

18. The non-transitory machine-readable storage medium as recited in claim 15, wherein the tracked events are selected from a group consisting of accessing a product webpage, ordering a product, adding a product to an electronic shopping cart, adding a product to a user wish list, and viewing the electronic shopping cart.

19. The non-transitory machine-readable storage medium as recited in claim 15, wherein the machine further performs operations comprising:

accessing a plurality of historic events;

providing an audience label for each user associated with the plurality of historic events; and calculating metrics for the plurality of historic events; and wherein:

the at least one terabyte of training data is generated based on the plurality of historic events, the audience labels, and the calculated metrics.

20. The non-transitory machine-readable storage medium as recited in claim 15, wherein the machine further performs operations comprising:

analyzing the tracked events that correspond to the users; and determining a persona identifier for each tracked event, each persona identifier being associated with a corresponding single user with one or more user traits comprising at least one of an email address, an IP address, and a telephone number.

* * * * *